United States Patent [19]

Drori

[11] 4,209,032

[45] Jun. 24, 1980

[54] AIR-RELIEF VALVES

[76] Inventor: Mordeki Drori, 89 Zahal St., Kiron, Israel

[21] Appl. No.: 908,011

[22] Filed: May 22, 1978

[51] Int. Cl.² ............................................. F16K 31/20
[52] U.S. Cl. .................... 137/202; 137/411; 137/630.15
[58] Field of Search .................... 137/202, 411, 630.15, 137/630.14

[56] References Cited

U.S. PATENT DOCUMENTS

| | | | |
|---|---|---|---|
| 2,673,618 | 3/1954 | Batchelder | 137/202 |
| 3,054,419 | 9/1962 | Farrell | 137/202 |
| 3,179,750 | 11/1965 | McCracken | 137/202 |

*Primary Examiner*—Alan Cohan
*Attorney, Agent, or Firm*—Benjamin J. Barish

[57] ABSTRACT

An air-relief valve is described comprising a housing having a large orifice at its upper end for releasing or admitting air when filling or emptying the water line to which it connected; a float formed with an axial bore; a first valve member having a head at its upper end disposed between the float and the large orifice, the first valve member further having a depending stem disposed in the axial bore of the float, and a small orifice communicating with the large orifice of the housing; a second valve member actuated by the float such that when the float rises it causes the second valve member to close the small orifice in the first valve member, the rising of the float also causing the first valve member to rise and to close the large orifice in the housing; and an abutment carried by the first valve member engageable by the float during the descent of the float to apply its weight to the first valve member tending to move same away from the large orifice.

13 Claims, 10 Drawing Figures

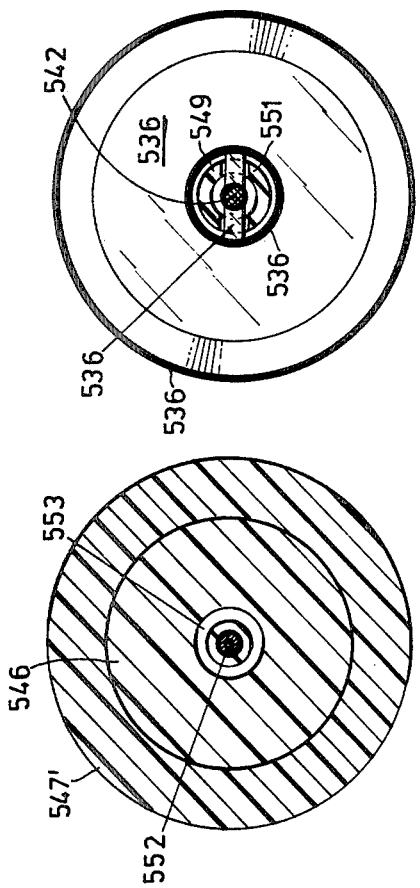
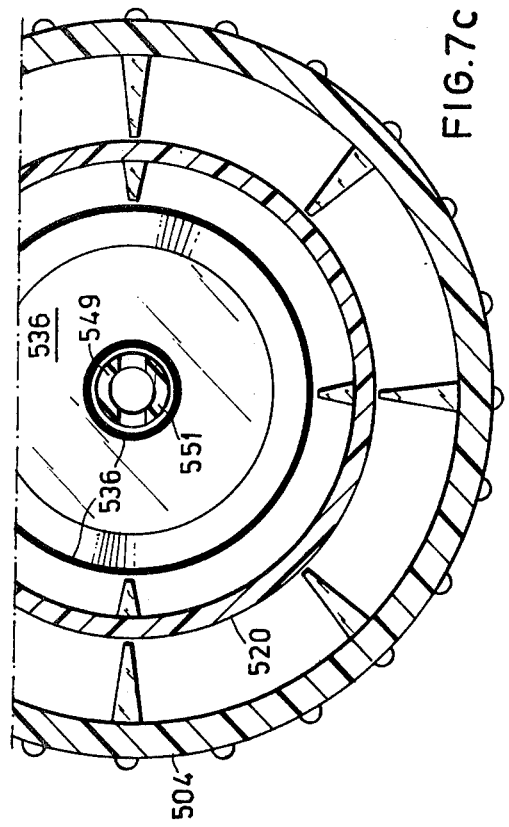
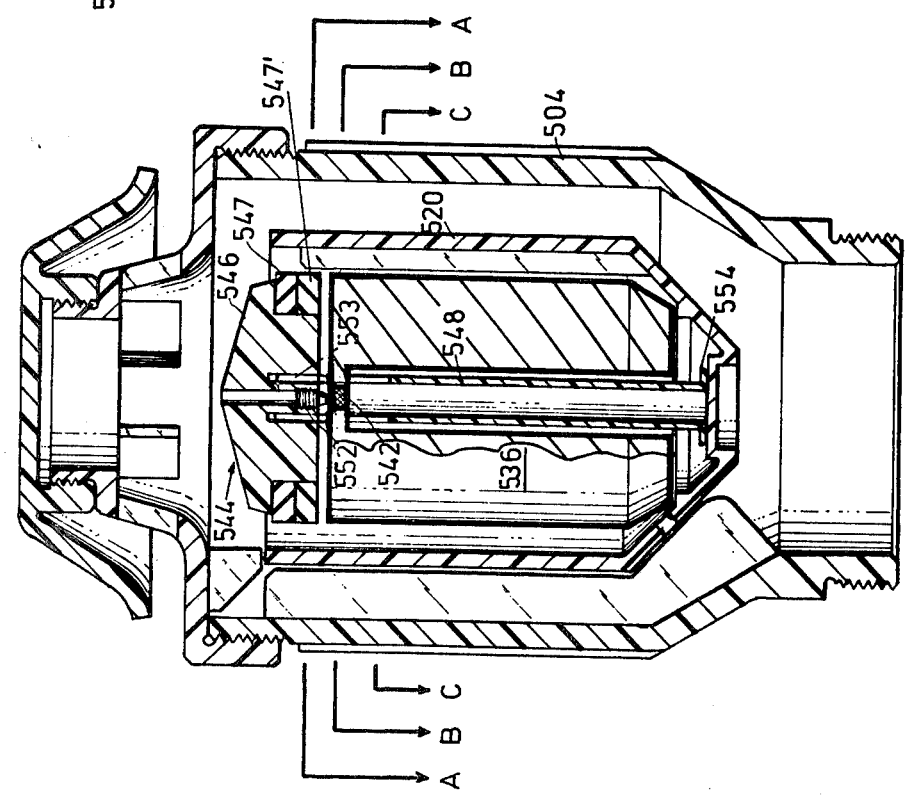

AIR-RELIEF VALVES

BACKGROUND OF THE INVENTION

The present invention relates to air-relief valves such as are used for releasing air from water pipelines.

There are two basic types of air relief valves, namely the single-orifice type and the double-orifice type. One form of the single-orifice type (commonly called a "kinetic" air relief valve) includes a large orifice for releasing or admitting large volumes of air during water filling or draining operations of the pipeline; a second form of the single-orifice type (commonly called an "automatic" air relief valve) includes a small orifice for releasing air accummulated under pressure in the pipeline during normal operating conditions. The double-orifice type is a combined unit including two single orifice valves, namely a kinetic large-orifice valve and an automatic small-orifice valve, the unit having a common connection to the pipeline.

Many forms of air-relief valves of both the single-orifice type and the double-orifice type are now commercially available. One form, particularly useful as a double-orifice valve, includes two bell-shaped floats, one nestable within the other, the outer float cooperating with the large orifice formed in the valve housing, and the inner float cooperating with a small orifice formed in the outer float. Such a nesting, two-float arrangement enables a very compact construction to be attained for a valve having a relatively high air-release capacity and a capability of operating under high pipeline pressures.

An object of the present invention is to provide a new form of air-release valve which can be constructed even more compactly for a given air-release capacity and pressure operating conditions of the pipeline.

SUMMARY OF THE INVENTION

According to a broad aspect of the present invention, there is provided an air-relief valve, comprising: a housing having a connection at its lower end for connecting same to a water pipeline, and a large orifice at its upper end for releasing or admitting air when filling or emptying the water line; a float within the housing adapted to rise and descend with an increase and decrease in the level of the water within the housing, said float having an axially extending bore; a first valve member having a head at its upper and disposed between the float and the large orifice, a depending stem disposed in said axial bore of the float, and a small orifice through said first valve member head to establish communication between the underside of said first valve member here and said large orifice of the housing; a second valve member movable by said float such that when the float rises it causes the second valve member to close the small orifice in the first valve member, the rising of the float also causing the first valve member to rise and to close said large orifice in the housing; and an abutment carried by said first valve member engageable by said float during the descent of the float to cause the float to apply its weight to the first valve member tending to move same away from the large orifice.

BRIEF DESCRIPTION OF THE DRAWINGS

The invention is herein described, by way of example only, with reference to the accompanying drawings wherein:

FIG. 7 is a longitudinal sectional view illustrating another form of double-orifice air relief valve constructed in accordance with the invention; and FIGS. 7a, 7b and 7c are fragmentary sectional views along lines A—A, B—B, and C—C of FIG. 7.

DESCRIPTION OF PREFERRED EMBODIMENTS

Figure 1:
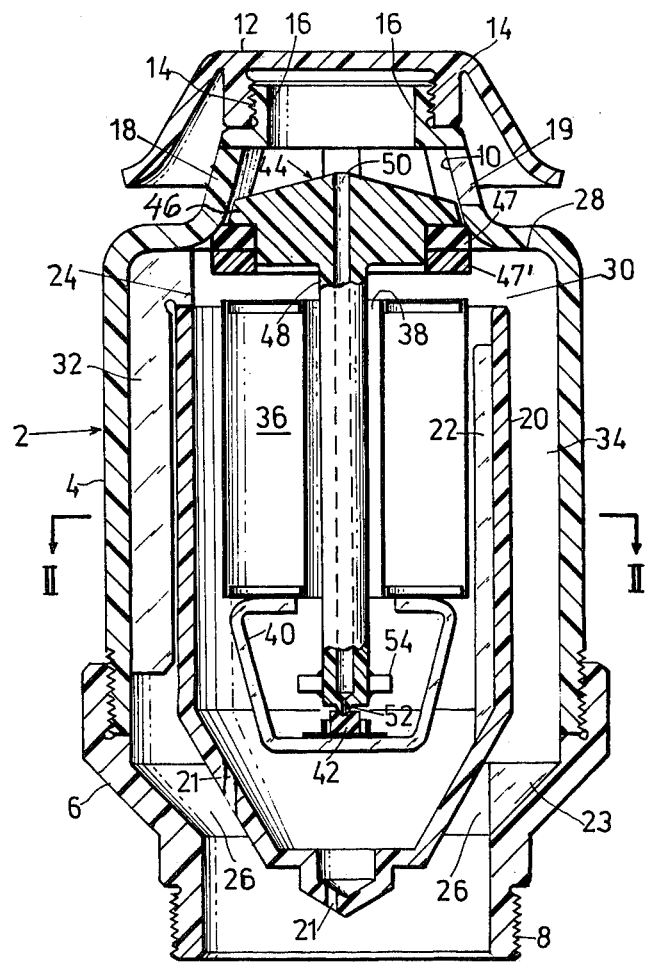
FIG. 1 is a longitudinal sectional view illustrating one form of double-orifice air relief valve constructed in accordance with the invention.
Figure 2:
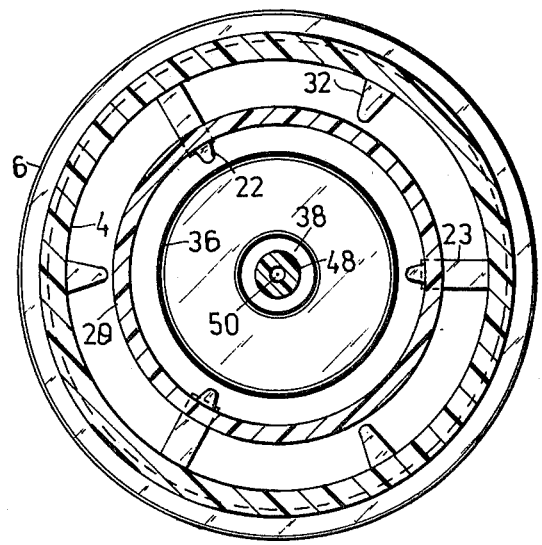
FIG. 2 is a transverse sectional view along lines II—II of FIG. 1.

The air-relief valve illustrated in FIGS. 1 and 2 is of the double-orifice type. It includes a housing, generally designated 2, having a main cylindrical section 4 threadedly received on a base 6. The lower end of base 6 is formed with threads 8 for connection to a water pipeline (not shown), and the upper end of housing section 4 is formed with a large orifice 10 for releasing and admitting air when filling or emptying the water line. A dirt-protecting cap 12 is threaded to the upper end of housing section 4 by means of threads 14 formed in cap 12 engageable with the threads of neck 16 at the upper end of housing Section 4. An intermediate portion of neck 16 is formed with alternating ribs 18 and spaces, the latter defining the large orifice 10 for releasing and admitting air.

Disposed within housing 2 is a cup-shaped member 20 open at the top, closed at the bottom except for openings 21, and including a plurality of axially-extending ribs 22. Member 20 is supported within the housing by a plurality of circumferentially-spaced lower ribs 23 formed in housing base 6, and another plurality of circumferentially-spaced ribs 24 formed in the upper end of housing section 4. The lower end of member 20 is thus spaced from base 6 to provide a passageway 26, and the upper end of the member is spaced from the upper end 28 of housing section 4 to provide another passageway 30. In addition, the inner face of housing section 4 is formed with a plurality of axially-extending, circumferentially-spaced ribs 32 spacing member 20 therefrom to provide a passageway 34 connecting passageways 26 and 30.

Disposed within the cup-shaped member 20 is a float 36 of substantially cylindrical configuration, the float being formed with an axially-extending bore 38 through its centre. The lower end of float 36 carries a bail 40 having a plug 42 of rubber or the like serving as a valve member for the small-orifice of the air-relief valve, as will be described more particularly below.

The large orifice 10 of the air-relief valve is controlled by a valve member, generally designated 44, including a head 46 lined with an annular sealing ring 47 disposed between float 36 and the orifice 10, the sealing ring being retained by a snap-fitted retainer ring 47'. Valve member 44 further includes a depending stem 48 received in axial bore 38 of float 36, and an axial bore 50 formed through its head 46 and stem 48, the lower end of the bore terminating in a small orifice 52 aligned with rubber plug 42 carried by the float. (two being shown) of protrusions 54 serving as abutments engageable by the lower end of float 36 during its descent.

The double-orifice air-relief valve illustrated in FIGS. 1 and 2, when connected by means of threaded 8 to the water pipe line (not shown), operates as follows:

As the pipe line is being filled with water, the valve housing 2 would be filled with air so that float 36 would be in its lowermost position, whereupon valve head 46 would be spaced away from the large orifice 10, and rubber plug 42 would be spaced away from the small orifice 52. In this condition of the valve, the air displaced in the pipeline during the water-filling operation is vented to the atmosphere through the large orifice 10 via passageways 26, 34, 30, and 16. As water starts to fill the valve, its float 36 rises with the increase in level of water in housing 2, until plug 42 of float 36 engages the small orifice 52 in stem 50 of the valve member 44, lifting the valve member until its head 46 seats against the large orifice 10, thereby closing the orifice. Head 46 will remain firmly seated against the large orifice 10 closing same all the while there is pressure within the pipeline, since its inner face is subjected to the pressure within the pipeline, whereas its outer face is subjected to the lower atmospheric pressure.

Now, during the normal pressurized operation of the pipeline, small quantities of air which tend to accummulate within the valve housing 2 will cause float 36 to rise and descend according to the level of the water within the housing. When the water level is high, which is the case when there is a relatively small quantity of air within the housing, plug 42 remains engaged with the small orifice 52, thereby preventing the release of the air and of the water in the pipeline. However, when the quantity of air increases, float 36 descends until plug 42 opens the small orifice 52, permitting the air to be vented through the small orifice 52, its bore 50, and then out through the large orifice 10 in the valve housing. As soon as the surplus air has thus been released from the valve, float 36 again rises until plug 42 closes the small orifice 52. In this manner, plug 42 moving with float 36 continuously releases small quantities of air that tend to accummulate within the valve housing during the normal, pressurized operation of the water pipeline.

During the emptying of the pipeline, the internal pressure within it is dropped to atmosphere or below, whereupon head 46 of valve member 44 is no longer held against the large orifice 10 by the internal pressure. In addition, float 36 descends, whereupon its lower face engages abutments 54. Valve member 44 is therefore drawn down by its own weight, aided by the weight of float 36, to move head 46 away from the large orifice 10, thereby permitting large quantities of air from the atmosphere to enter the water pipeline via passageways 16 and the large orifice 10.

As indicated earlier, the single-float construction of FIGS. 1 and 2 provide a number of important advantages:

First, it permits a more compact construction, for a given air-release capacity and internal pressure operating conditions, when compared to the nesting double-float arrangement of the above-cited patent. This will be better understood from the following:

When the water level rises in the valve housing, the force moving the float to close the small orifice depends on the boyancy of the float; accordingly, considering only this factor, the float should be as light as possible for a given volume. On the other hand, when the water level drops, the force holding the float to the small orifice is the product of the internal pressure within the pipeline (less atmospheric pressure), multiplied by the cross-sectional area of the small orifice; accordingly, to permit the float to drop quickly with the lowering of the water level, the float should either be very heavy (which means a large volume because of the boyancy requirement), or the cross-sectional area of the small orifice should be very small. Making the area small decreases the air-release capacity of the valve during the normal pressurized operation of the pipeline, and moreover introduces manufacturing difficulties.

Since, in the valve of FIGS. 1 and 2, only a single float (36) is used, this float, for a given valve air-release capacity and pressure operating conditions, may be of maximum volume to provide sufficient boyant force for closing the small orifice 52 during the rising of the water level within the housing, and of maximum weight for opening the orifice 52 during the descent of the water level within the housing. Thus, the valve housing may be constructed very compactly, and/or the small orifice 52 may be of relatively large diameter (when compared to the prior arrangements) thereby simplifying its construction.

In addition, the arrangement of FIGS. 1 and 2, including the cylindrical configuration of float 36 and the depending stem 48 of valve member 46, provides a guide for the ascent and descent of float 36 during the normal operation of the valve in the pressurized pipeline; also, when the pipe line is being empties, it hastens the unseating of valve head 46 from large orifice 10 by causing the weight of float 36 to be added to that of valve member 44 by the engagement of the float with abutments 54 on stem 48 of the valve member.

Figure 3:
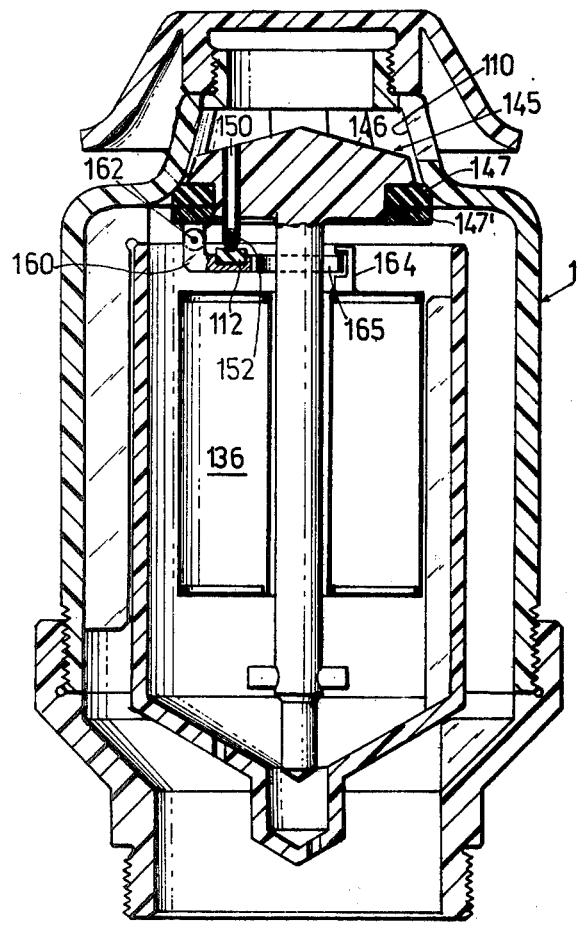
FIG. 3 is a transverse sectional view of another form of double-orifice air-relief valve constructed in accordance with the invention.

FIG. 3 illustrates a variation wherein the closing and opening force applied by the float to its valve member to open and close the small orifice, is multiplied. For this purpose, the small orifice 152 is formed through the head 146 of the valve member 145 closing the large orifice 110, the small orifice 152 being at the lower end of a bore 150 formed through head 146. In addition, the rubber plug 112, serving as the valve member closing the small orifice 152, is carried by an arm 160 pivotably mounted at 162 to the underside of head 146. Further, float 136 includes an actuator, in the form of a slotted member 164 fixed to the upper end of the float, which actuator engages a loop 165 at the end of arm 160 to pivot same and thereby to cause plug 112 to close the small orifice 152 upon rising of the float, and to open the orifice upon descending of the float.

An important feature in the arrangement illustrated in FIG. 3 is that the rubber plug 112 is carried on arm 160 between the actuator 164 and the pivot point 162 of the arm, whereby the force applied to plug 112 by the movement of the float 136 is multiplied. This arrangement further permits the size of the float 136 to be decreased for given air-release capacities, and/or enables larger diameter orifices to be used, thereby providing a larger air-release capacity and permitting simpler manufacturing processes, for a given size of the air-relief valve.

Figure 4:
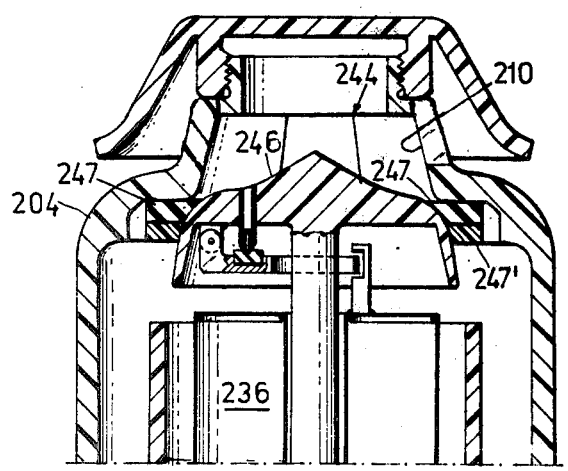
FIG. 4 is a fragmentary view illustrating a modification in the valve of FIG. 3.

FIG. 4 illustrates a modification in the construction of FIG. 3, namely in attaching the sealing ring 247, and its retaining ring 247' for the large orifice 210 to the upper end of the housing section 204, rather than to the head 246 of the valve member 244.

As indicated earlier, while the invention is particularly useful with respect to the double-orifice type air-relief valve, certain of its features could also advantageously be used in the single-orifice type. This is shown in FIG. 5 which illustrates a single-orifice (small) type air-relief valve including a forced-multiplying arrangement of FIG. 3 for controlling the small orifice.

Figure 5:
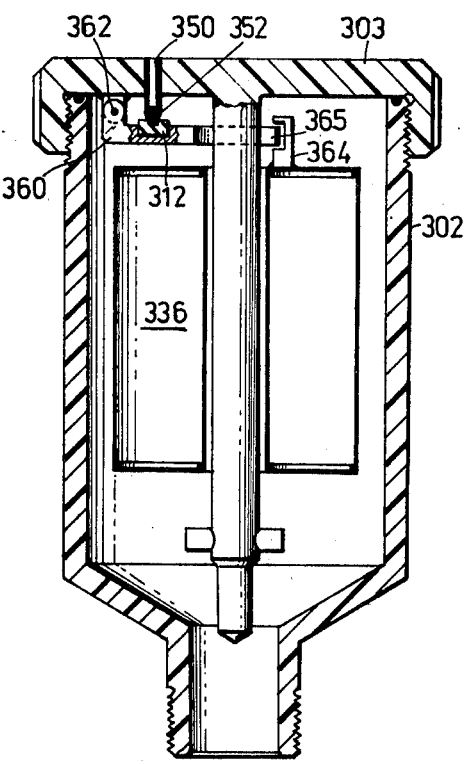
FIG. 5 is a longitudinal sectional view illustrating a single-orifice air-relief valve constructed in accordance with the invention.

Thus, as shown in FIG. 5, the housing 302 does not include a large orifice, but rather is closed at its top by a member 303 having the small orifice 352 at the end of a bore 350 passing therethrough. The rubber plug 312, serving as the valve member for opening and closing orifice 352, is carried by an arm 360 pivotably mounted at 362 to the underside of member 303. As described above in connection with FIG. 3, the float 336 carries an actuator 364 which engages a loop 365 formed at the end of arm 360 to pivot same towards and away from the small orifice 352 during the rising and descent, respectively, of the float. The single orifice valve illustrated in FIG. 5 could thus be used as an automatic valve for releasing small quantities of air accummulated within the pipeline during the normal pressurized operation of the pipeline.

Figure 6:
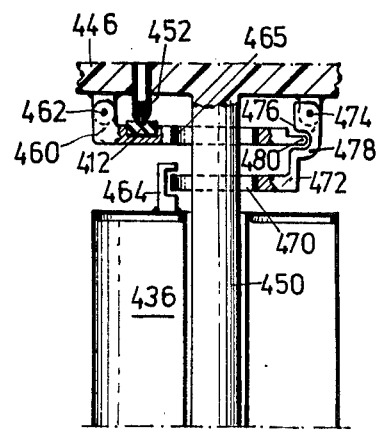
FIG. 6 is a fragmentary view illustrating modification applicable either to the double-orifice valve of FIGS. 3 and 4, or the single-orifice valve of FIG. 5.

FIG. 6 illustrates a still further variation, which can be applied either to the single-orifice air-relief valve illustrated in FIG. 5, or to the double-orifice valves illustrated in the remaining figures.

In the variation of FIG. 6, the small orifice 452 is controlled by a rubber plug 412 carried by an arm 460 pivotably at 462 to member 446 through which the orifice is formed. In this modification, however, the actuator 464 carried by the float 436 does not directly engage loop 465 formed at the end of pivotable arm 460, but rather engages another loop 470 carried at the end of another arm 472 pivotable at 474 to member 446 at the side of stem 450 opposite to that of arm 460. The end of arm 472 is formed with a lip 476 on one side of its pivot point 474, and with a bend 478 on the other side, both engageable with the tip 480 of pivotable arm 460. The foregoing structure provides a double-lever-arm (pivotable arms 460 and 472) for further multiplying the force applied by the raising and lowering of float 436 in moving the rubber plug 412 to close or open the small orifice 452.

It will be appreciated that the double-lever-arrangement of FIG. 6 could be used either in a double-orifice type valve, whereupon member 446 would be the head (e.g. 146 in FIG. 3) of the valve member cooperable with the large orifice of the valve, or in a single-orifice type valve, whereupon member 446 would be the closure member (corresponding to 303 in FIG. 5).

FIG. 7, and its sectional views FIGS. 7a, 7b and 7c, illustrate a further form of double-orifice air relief valve constructed in accordance with the invention. The air relief valve of FIG. 7 is of similar construction to that of FIGS. 1 and 2, except that its valve member 544 (comparable to valve member 44 in FIG. 1) is made of two separate sections, namely a head 546 and a stem 548 removably attached to the head; in addition, the small orifice 552 (comparable to orifice 52 in FIG. 1) is formed centrally through the head 546, and the rubber plug valve member 542 cooperable with the small orifice 552 is carried at the upper end of the cylindrical float 536, rather than at its lower end as in FIG. 1.

Stem 548 is formed as a hollow tube with its upper and bifurcated to produce two curved ends 549, 551 (FIGS. 7b and 7p) which are received in a circular recess 553 (FIGS. 7, 7a) formed in the underside of head 546 around its central orifice 552. Accordingly, tube 548 may be conveniently press-fitted into head 546 by forcing the bifurcated end of the tube into recess 553. In addition, the upper end of float 536 is formed with semicircular passageways or channels on opposite sides of the rubber-plug member 542, to accommodate the bifurcated ends 549, 551 of the stem 548. Further the lower end of stem 548 is formed with an out-turned flange 554 serving as the abutment for engagement by the lower surface of float 536 during its descent.

The air-relief valve illustrated in FIGS. 7 and 7a–7c is otherwise of substantially the same construction including the outer housing section 504 and the inner cup-shaped member 520 (corresponding to elements 4 and 20 in FIGS. 1 and 2), and operates in substantially the same manner as the air-relief described above with reference to FIGS. 1 and 2.

What is claimed is:

1. An air-relief valve, comprising; a housing having a connection at its lower end for connecting same to a water pipeline, and a large orifice at its upper end for releasing or admitting air when filling or emptying the water line; a float within the housing adapted to rise and descent with an increase and decrease in the level of the water within the housing, said float having an axially extending bore; a first valve member having a head at its upper and disposed between the float and the large orifice, a depending stem disposed in said axial bore of the float, and a small orifice through said first valve member head to establish communication between the underside of said first valve member head and said large orifice of the housing; a second valve member movable by said float such that when the float rises it causes the second valve member to close the small orifice in the first valve member, the rising of the float also causing the first valve member to rise and to close said large orifice in the housing; and an abutment carried by said first valve member engageable by said float during the descent of the float to cause the float to apply its weight to the first valve member tending to move same away from the large orifice.

2. A valve according to claim 1, wherein said float is of substantially cylindrical configuration.

3. A valve according to claim 1, wherein said abutment includes a shoulder protruding from the lower end of the first valve member stem and engageable by the lower end of the float during the descent thereof.

4. A valve according to claim 1, wherein said stem in the first valve member is formed with an axial bore extending completely therethrough and terminating at its lower end at said small orifice, said second valve member being carried at the lower end of said float.

5. A valve according to claim 4, wherein said second valve member is carried by a bail secured to the lower end of said float.

6. A valve according to claim 1, wherein said small orifice is formed through said head of the first valve member, said second valve member being carried by an arm pivotably mounted to the lower end of the head of the first valve member, said float including an actuator which pivots said arm to cause the second valve member to close said small orifice upon rising of the float, and to open said small orifice upon descending of the float.

7. A valve according to claim 6, wherein said second valve member is carried on said arm between the actuator and the pivot point of the arm to thereby multiply the force applied to the second valve member by the movement of the float.

8. A valve according to claim 7, wherein said actuator engages said pivotable arm to pivot same.

9. A valve according to claim 7, wherein said actuator engages a second arm pivotable to said first valve member head on the other side of its stem from the pivotable mounting of the first-mentioned arm carrying said second valve member, said second pivotable arm engaging said first-mentioned arm to pivot same to thereby further multiply the force applied to the second valve member by the movement of said float.

10. A valve according to claim 1, wherein said stem of the first valve member is removably attached to the head of the first valve member.

11. A valve according to claim 10, wherein said stem comprising a tubular member having a bifurcated upper end press-fitted into a recess formed on the underside of the first valve member head.

12. A valve according to claim 1, wherein said small orifice is formed centrally of said first valve member head, said second valve member being disposed at the upper end of said float in alignment with said small orifice.

13. A valve according to claim 1, wherein said first valve member head comprises a sealing ring for closing said large orifice when said first valve member is raised by the float, and a snap-fit retaining ring for retaining said sealing ring on the first valve member head.

* * * * *